United States Patent
Gridish et al.

(10) Patent No.: US 10,473,857 B2
(45) Date of Patent: Nov. 12, 2019

(54) GRADIENT-INDEX WAVEGUIDE LATERAL COUPLER HAVING AN ACTIVE REGION WITH AN INDEX OF REFRACTION THAT IS NON-CONSTANT LATERALLY

(71) Applicant: Mellanox Technologies, Ltd., Yokneam (IL)

(72) Inventors: Yaakov Gridish, Yoqneam Ilit (IL); Eran Aharon, Mevaseret Zion (IL); Elad Mentovich, Tel Aviv (IL); Sylvie Rockman, Zichron Yaakov (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 16/031,428

(22) Filed: Jul. 10, 2018

(65) Prior Publication Data
US 2019/0018192 A1    Jan. 17, 2019

Related U.S. Application Data

(60) Provisional application No. 62/531,117, filed on Jul. 11, 2017.

(51) Int. Cl.
*G02B 6/14* (2006.01)
*G02B 6/028* (2006.01)
*G02B 6/26* (2006.01)
*G02B 6/12* (2006.01)

(52) U.S. Cl.
CPC .............. *G02B 6/14* (2013.01); *G02B 6/0288* (2013.01); *G02B 6/262* (2013.01); *G02B 2006/12095* (2013.01); *G02B 2006/12147* (2013.01)

(58) Field of Classification Search
CPC ........ G02B 6/14; G02B 6/262; G02B 6/0288; G02B 2006/12147; G02B 2006/12095
See application file for complete search history.

(56) References Cited

U.S. PATENT DOCUMENTS

| | | | | |
|---|---|---|---|---|
| 6,870,624 B2 * | 3/2005 | Hobbs | ..................... | G02B 5/204 356/416 |
| 7,184,623 B2 * | 2/2007 | Cai | ..................... | G02B 6/2552 359/333 |
| 7,218,809 B2 * | 5/2007 | Zhou | ..................... | G02B 6/1228 385/28 |
| 7,260,279 B2 * | 8/2007 | Gunn | ..................... | H01S 5/142 372/18 |
| 7,289,698 B2 * | 10/2007 | Deliwala | ............. | G02B 6/1228 385/123 |

(Continued)

OTHER PUBLICATIONS

Taillaert, D., et al., "An Out-Of-Plane Grating Coupler for Efficient Butt-Coupling Between Compact Planar Waveguides and Single-Mode Fibers", *IEEE Journal of Quantum Electronics*, Jul. 2002, pp. 949-955, vol. 38, No. 7, retrieved from <http://pcphotonics.intec. ugent.be/download/pub_1267.pdf> on Oct. 11, 2018.

(Continued)

*Primary Examiner* — Andrew Jordan
(74) *Attorney, Agent, or Firm* — Alston & Bird LLP

(57) ABSTRACT

A waveguide having a gradient-index (GRIN) waveguide lateral coupler is provided. In an example embodiment, the waveguide comprises an active region. The refractive index profile of the active region is non-constant.

20 Claims, 5 Drawing Sheets
(3 of 5 Drawing Sheet(s) Filed in Color)

(56) References Cited

U.S. PATENT DOCUMENTS

| | | | | |
|---|---|---|---|---|
| 7,426,328 B2 * | 9/2008 | Zhou | ............... | G02B 6/32 359/652 |
| 7,480,425 B2 * | 1/2009 | Gunn | ............... | G02B 6/12007 385/14 |
| 7,616,856 B2 * | 11/2009 | Zhou | ............... | G02B 6/32 385/124 |
| 8,374,506 B2 * | 2/2013 | Stark | ............... | H04B 10/801 398/114 |
| 8,538,208 B2 * | 9/2013 | Ho | ............... | G02B 6/0281 385/131 |
| 8,605,760 B2 * | 12/2013 | Liang | ............... | H01S 5/142 372/18 |
| 8,755,650 B2 * | 6/2014 | Peng | ............... | G11B 5/3133 385/124 |
| 8,971,679 B2 * | 3/2015 | Ho | ............... | G02B 6/32 385/131 |
| 9,110,009 B2 * | 8/2015 | Schulte | ............... | G01N 21/31 |
| 9,250,390 B2 * | 2/2016 | Muendel | ............... | G02B 6/32 |
| 9,759,863 B1 * | 9/2017 | Peng | ............... | G11B 5/6088 |
| 9,784,920 B2 * | 10/2017 | Anderson | ............... | G02B 6/32 |
| 10,033,148 B2 * | 7/2018 | Pax | ............... | G02B 6/02338 |
| 2003/0044118 A1 * | 3/2003 | Zhou | ............... | G02B 6/1228 385/43 |
| 2003/0210396 A1 * | 11/2003 | Hobbs | ............... | G02B 1/005 356/416 |
| 2005/0036738 A1 * | 2/2005 | Zhou | ............... | G02B 6/32 385/33 |
| 2005/0265653 A1 * | 12/2005 | Cai | ............... | G02B 6/2552 385/28 |
| 2005/0286602 A1 * | 12/2005 | Gunn | ............... | H01S 5/142 372/94 |
| 2006/0062521 A1 * | 3/2006 | Zhou | ............... | G02B 6/1228 385/43 |
| 2008/0001062 A1 * | 1/2008 | Gunn | ............... | G02B 6/12007 250/206 |
| 2009/0046979 A1 * | 2/2009 | Zhou | ............... | G02B 6/32 385/43 |
| 2010/0135615 A1 * | 6/2010 | Ho | ............... | G02B 6/0281 385/33 |
| 2012/0039346 A1 * | 2/2012 | Liang | ............... | H01S 5/0656 372/20 |
| 2012/0242992 A1 * | 9/2012 | Schulte | ............... | G01N 21/31 356/432 |
| 2013/0064514 A1 * | 3/2013 | Peng | ............... | G11B 5/3133 385/124 |
| 2013/0331689 A1 * | 12/2013 | Le | ............... | A61B 5/0084 600/425 |
| 2013/0331709 A1 * | 12/2013 | Le | ............... | G02B 6/32 600/478 |
| 2015/0016775 A1 * | 1/2015 | Ho | ............... | G02B 6/32 385/33 |
| 2015/0219989 A1 * | 8/2015 | Ho | ............... | G02B 6/32 385/33 |
| 2016/0367836 A1 * | 12/2016 | Kampasi | ............... | A61N 5/0622 |
| 2017/0229834 A1 * | 8/2017 | Pax | ............... | G02B 6/02338 |
| 2017/0229838 A1 * | 8/2017 | Dawson | ............... | G02B 6/02338 |
| 2018/0011324 A1 * | 1/2018 | Popovich | ............... | G02B 6/003 |
| 2018/0132698 A1 * | 5/2018 | Galstian | ............... | G02F 1/29 |
| 2019/0018192 A1 * | 1/2019 | Gridish | ............... | G02B 6/14 |

OTHER PUBLICATIONS

Vermeulen, Diedrik, et al., "High-Efficiency Fiber-To-Chip Grating Couplers Realized Using an Advanced CMOS-Compatible Silicon-On-Insulator Platform", *Optics Express*, Aug. 16, 2010, pp. 18278-18283, vol. 18, No. 17 retrieved from <https://www.osapublishing.org/DirectPDFAccess/F06367E6-9E6B-F624-11D6E847A0164511_205047/oe-18-17-18278.pdf?da=1&id=205047&seq=0&mobile=no> on Oct. 11, 2018.

* cited by examiner

| f(x) | Loss [dB] |
|---|---|
| $x$ | -0.94 |
| $x^2$ | -0.95 |
| $x^3$ | -1 |

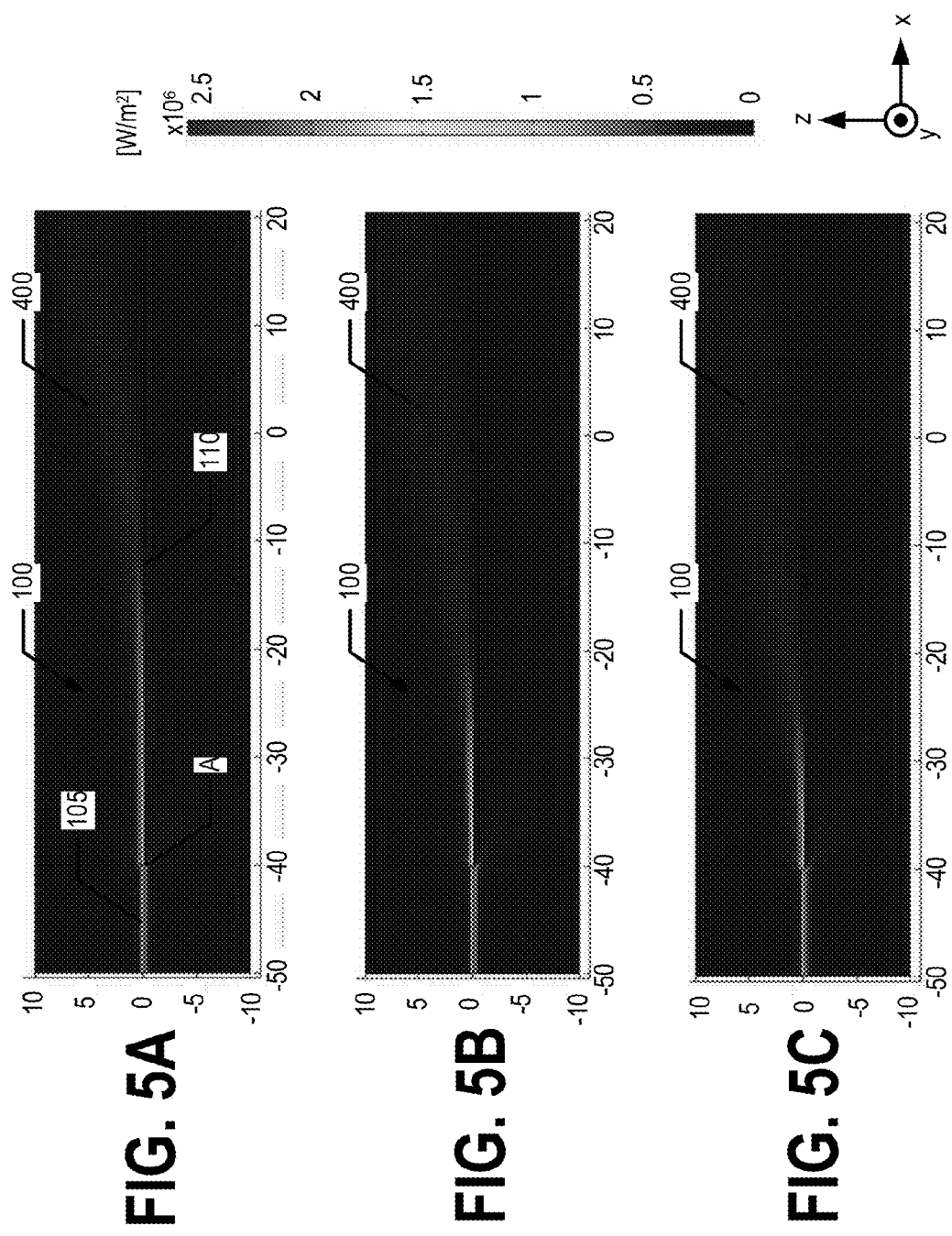

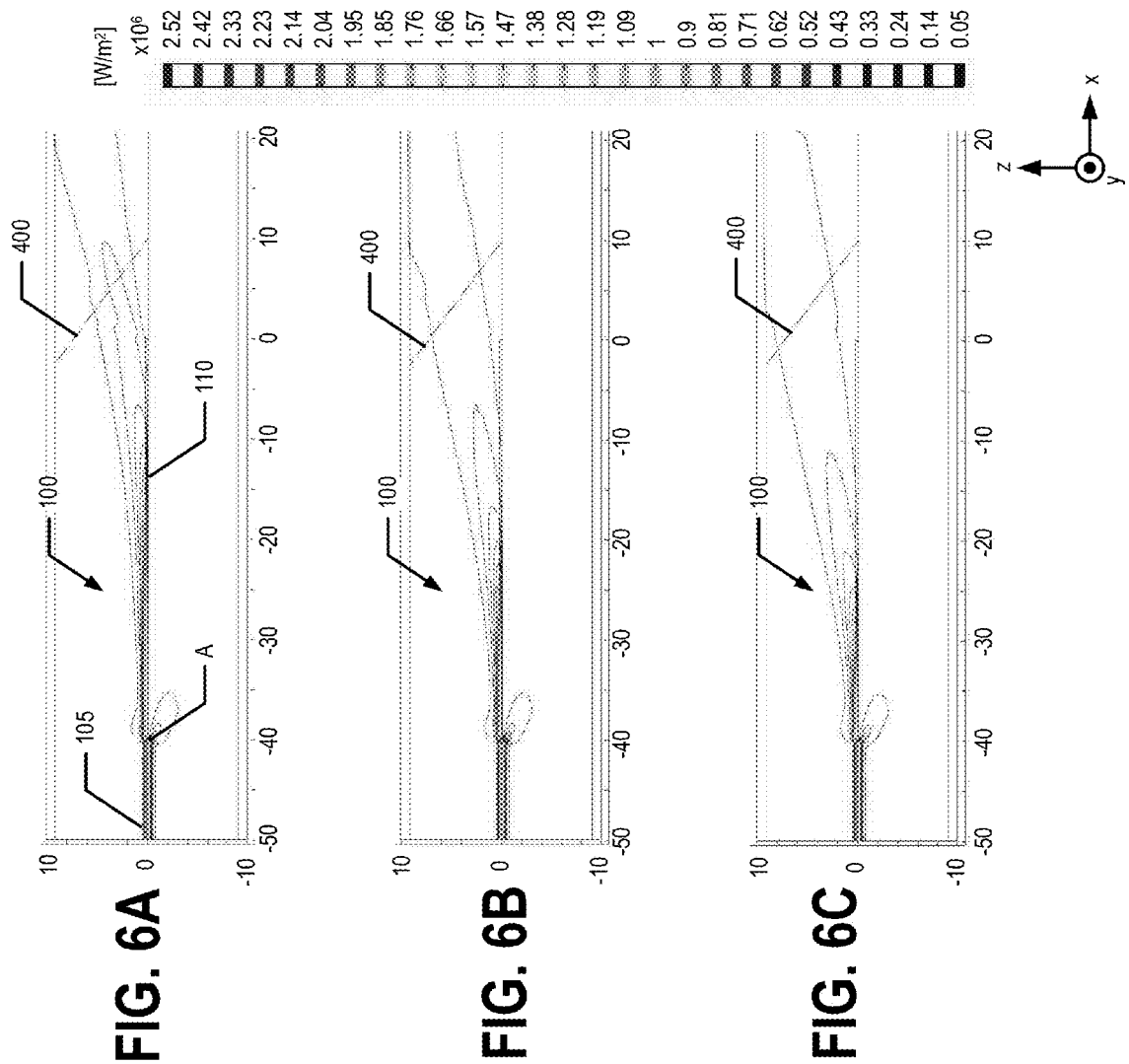

US 10,473,857 B2

GRADIENT-INDEX WAVEGUIDE LATERAL COUPLER HAVING AN ACTIVE REGION WITH AN INDEX OF REFRACTION THAT IS NON-CONSTANT LATERALLY

CROSS-REFERENCE TO RELATED APPLICATIONS

This application claims priority to U.S. application Ser. No. 62/531,117, filed Jul. 11, 2017, the entirety of the contents of which are incorporated by reference herein.

BACKGROUND OF THE INVENTION

Example embodiments generally relate to the field of photonics integrated circuits (PICs) lateral couplers. For example, an example embodiment provides a gradient-index (GRIN) waveguide lateral coupler.

Technologies for producing compact optical communication systems are available using complementary metal-oxide-semiconductor (CMOS) compatible processes, for example, in the form of PICs. Efficient coupling between a PIC waveguide and an external optical fiber, however, can be a major challenge due to a modal mismatch at the waveguide-optical fiber interface. The modal mismatch of coupling between PIC waveguides and external optical fibers can be a larger challenge when the optical fiber is outside the plane of the waveguide (e.g., when the waveguide-optical fiber interface is not perpendicular to the direction of propagation defined by the waveguide), due to the guided nature of the waveguide modes. Currently, grating couplings are generally used to couple out-of-plane optical fibers to PIC waveguides. For example, grating couplings are generally used as waveguide lateral couplers. Grating couplings however, can be difficult to design and manufacture and generally result in a significant loss of beam power.

Therefore, a need exists in the art for improved methods, devices, and/or the like for coupling PIC waveguides to external optical fibers.

BRIEF SUMMARY

Example embodiments provide methods, devices, methods for manufacturing devices, and/or the like for a waveguide lateral coupler. Various example embodiments provide a GRIN waveguide lateral coupler, method for using a GRIN waveguide lateral coupler, photonic integrated circuit comprising a GRIN waveguide lateral coupler, method for manufacturing a GRIN waveguide lateral coupler, and/or the like. In an example embodiment, a GRIN waveguide lateral coupler is and/or comprises an active region of a waveguide that allows a beam (or at least a portion thereof) traveling through at least a portion of the waveguide to be coupled out of the waveguide via a surface of the waveguide that defines a plane that is parallel to the direction of propagation defined by the waveguide. In an example embodiment, a GRIN waveguide lateral coupler is and/or comprises an active region of a waveguide, wherein the refractive index profile of the active region of the waveguide is non-constant with respect to the direction of propagation defined by the waveguide. For example, the refractive index of the active region may decrease along the direction of propagation of the waveguide. In an example embodiment, a dielectric or metallic mirror is disposed along a surface of the active region. For example, a dielectric or metallic mirror may be disposed along the surface of the active region that is opposite the waveguide surface across which the lateral coupling is to be accomplished. In an example embodiment, a GRIN waveguide lateral coupler is manufactured using a gray-scale lithography process. In an example embodiment, a GRIN waveguide lateral coupler is manufactured using a sub-wavelength grating.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee. Having thus described the invention in general terms, reference will now be made to the accompanying drawings, which are not necessarily drawn to scale, and wherein.

Figure 3:
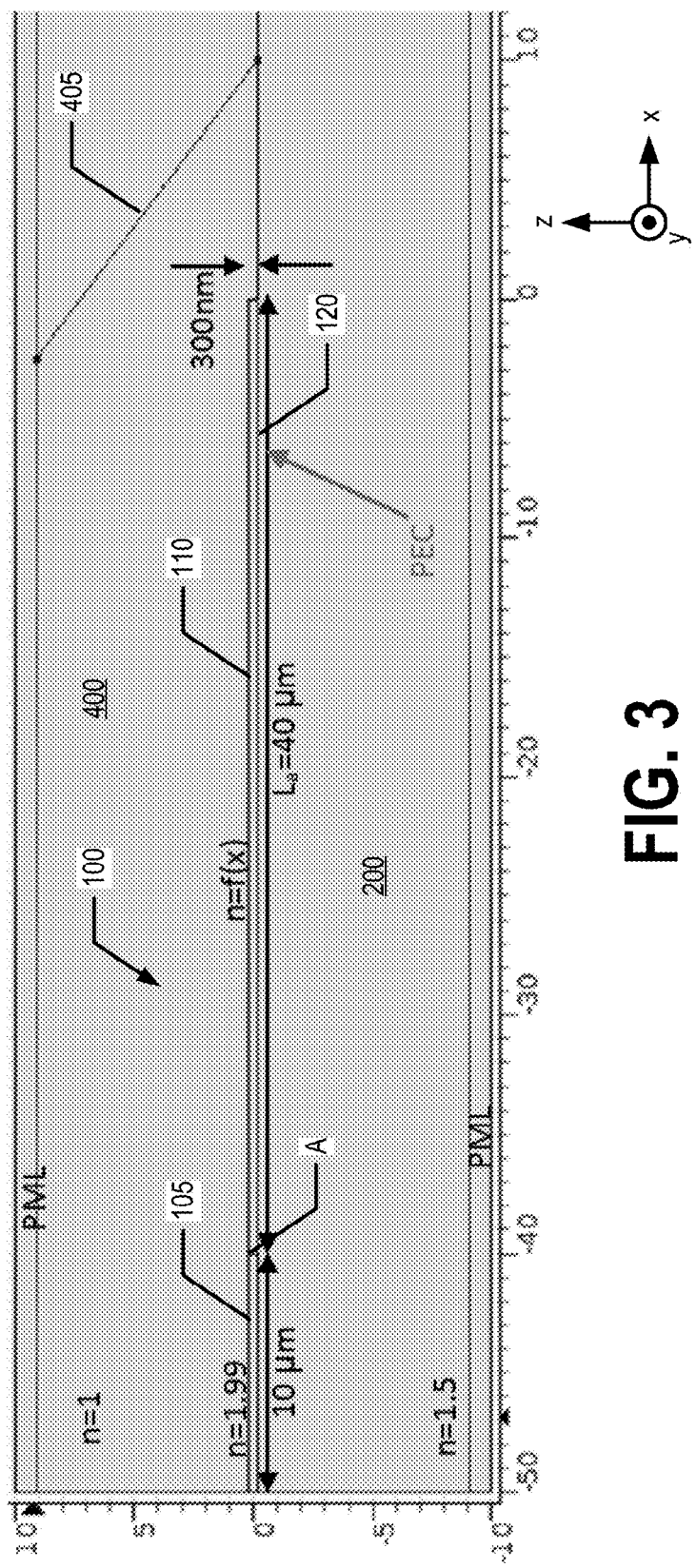
FIG. 3 is a schematic edge-on view of a simulated GRIN waveguide lateral coupler, according to an example embodiment.
Figures 4, 7:
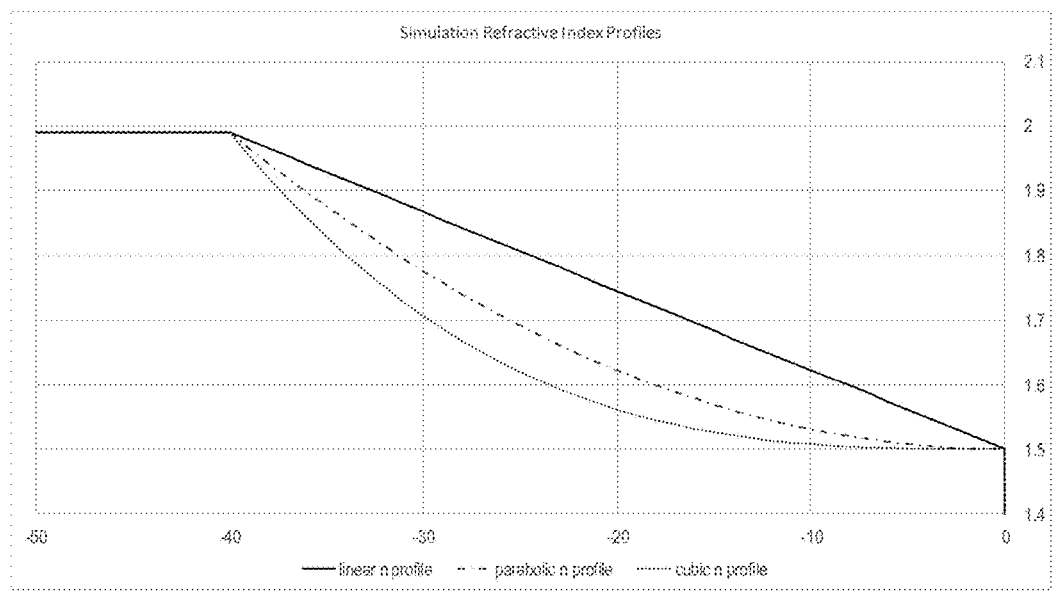
FIG. 4 is a graph showing three different refractive index profiles for which simulation results were investigated for the example GRIN waveguide lateral coupler shown in FIG. 3.

FIGS. 5A, 5B, and 5C show the simulation results of the GRIN waveguide lateral coupler shown in FIG. 3 for the three different refractive index profiles shown in FIG. 4;

FIGS. 6A, 6B, and 6C show contour plots of the power flow of the simulation results shown in FIGS. 5A, 5B, and 5C; and FIG. 7 is a table providing the calculated losses for each of the simulation results shown in FIGS. 5A, 5B, and 5C and FIGS. 6A, 6B, and 6C.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
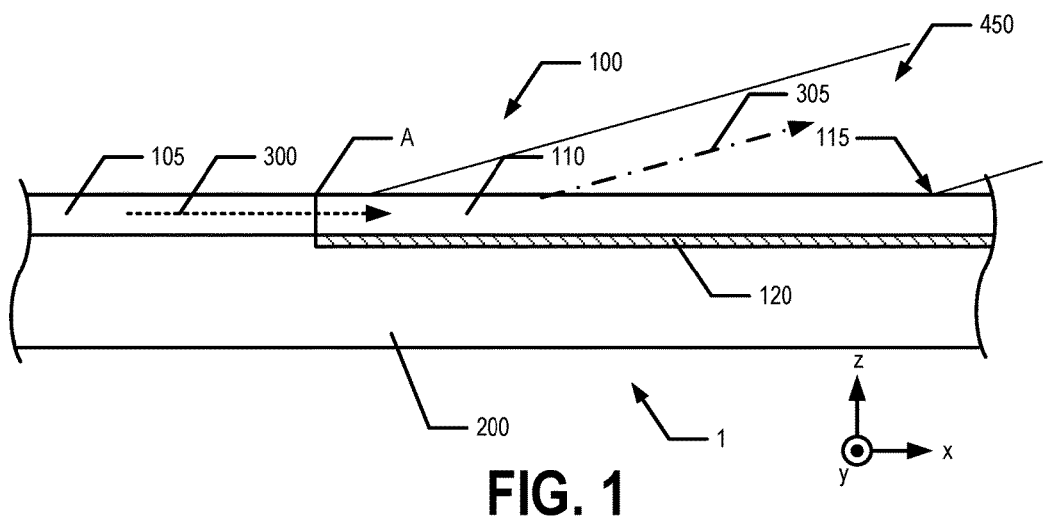
FIG. 1 is a schematic of a cross-section of an example PIC waveguide having a GRIN waveguide lateral coupler, according to an example embodiment.

PICs are a current area of investigation for a variety of applications. For example, various types of PICs have applications in fiber-optic communications, the biomedical field, photonic computing, and other fields. Various fiber-optic communications applications, for example, may require a signal from a PIC waveguide to be passed to an external optical fiber cable. Thus, efficient methods for coupling and/or efficient coupling devices are needed for coupling a PIC waveguide to an external optical fiber cable. FIG. 1 illustrates a partial cross section of an example PIC 1 comprising a waveguide 100 on a substrate 200. For example, the substrate 200 may be a silicon wafer, wafer made of another material appropriate for the application, and/or other application appropriate substrate. The waveguide 100 may generally be a silicon oxide or silicon nitride waveguide or a waveguide made of another material that is appropriate for the application. In various embodiments, the waveguide 100 is configured (e.g., sized, shaped, formed, etc.) as a waveguide for near infrared, optical, and/or UV electromagnetic radiation. In an example embodiment, the waveguide 100 defines a direction of propagation 300. For example, the group velocity of an electromagnetic beam being guided and/or propagated along the waveguide 100 may be parallel to the direction of propagation 300, in at least a portion of the waveguide.

Figure 2:
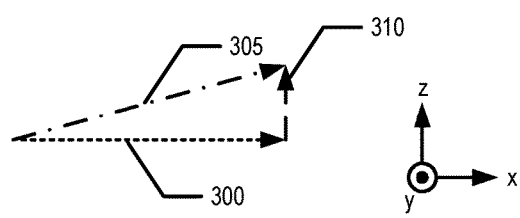
FIG. 2 is a diagram of the group velocity of a beam exiting the coupling surface of the GRIN waveguide lateral coupler, according to an example embodiment.

In an example embodiment, the waveguide 100 comprises a guiding region 105 and an active region 110. The active region 110 is configured (e.g. sized, shaped, formed, etc.) to provide lateral coupling of the waveguide 100 through the coupling surface 115. For example, the guiding region 105 may define a direction of propagation 300 of the waveguide 100. The active region 110 may cause a beam traveling through the active region to be refracted such that the group velocity of the beam has a component 310 in a direction that is perpendicular to the direction of propagation 300 of the waveguide 100, as shown in FIG. 2. For example, the beam traveling from the guiding region 105 and then into/through the active region 110 may be refracted such that the beam, or at least a portion thereof, has a group velocity 305 that is not parallel to the direction of propagation 300 of the waveguide. The beam or portion thereof having the non-parallel group velocity 305 will therefore cross the coupling surface 115 and may then be provided to an external optical fiber 450, used to optically probe the wave-front, and/or the like. For example, the active region 110 may cause the guided mode of an electromagnetic beam that propagated through the guiding region 105 into the active region 110 to be coupled to the radiated mode of the electromagnetic beam.

In example embodiments, the active region 110 is a GRIN waveguide lateral coupler. For example, in an example embodiment, the refractive index profile of the active region 110 is not constant along the direction of propagation 300 (shown as the x-direction in FIG. 1). For example, the derivative of the refractive index along the direction of propagation 300 is generally non-zero in the active region 110. In an example embodiment, the derivative of the refractive index along the direction of propagation 300 is generally non-zero and smooth in the active region 110. In an example embodiment, the refractive index of the active region 110 decreases along the direction of propagation 300. For example, as shown in FIG. 4, in some example embodiments, the refractive index of the active region 110 decreases monotonically along the direction of propagation 300 along the length of the active region 110. For example, as an electromagnetic beam propagates through the active region 110, the change in the refractive index along the direction of propagation 300 will cause the group velocity of the beam, or a portion of the beam, to acquire a component 310 in a direction that is perpendicular to the direction of propagation 300. The resulting group velocity 305 of the electromagnetic beam, or a portion thereof, will be out of alignment with the axis of the waveguide and will cause the beam, or the portion thereof, to cross the coupling surface 115. For example, the electromagnetic beam or a portion thereof will exit the waveguide 100 via the coupling surface 115. The beam or portion of the beam that crosses the coupling surface 115 may be provided to an optical fiber, used to optically probe the wave-front of the beam, and/or the like.

The waveguide 100 is shown as having a well-defined interface A between the guiding region 105 and the active region 110 in FIG. 1; however, in an example embodiment, the active region 110 is integrally formed with the waveguide 100. Thus, an electromagnetic beam propagating along the waveguide 100 may not experience an abrupt interface A between the guiding region 105 and the active region 110. As such, the electromagnetic beam will not experience substantial loss, aberration, or distortion when crossing from the guiding region 105 into the active region 110. In other example embodiments, the active region 110 is not integrally formed with the waveguide 100, and the interface A may be an interface (e.g., a butt-coupled interface and/or the like) between a guiding region 105 and a separate active region 110 that have been joined to form the waveguide 100.

In an example embodiment, the active region 110 may be formed using a gray-scale lithography process. For example, in an example embodiment, the waveguide 100 may be formed, and then a portion of the waveguide 100 may be modified to form the active region 110. In another example embodiment, the active region 110 is formed at the same time as the guiding region 105 of the waveguide 100. For example, one or more gray-scale lithography processes may be used to control the concentration of one or more materials within a portion of the waveguide 100 to modify the refractive index within that portion of the waveguide such that the refractive index profile within that portion is non-constant, thereby forming the active region 110. For example, one or more gray-scale lithography processes may be used to control the concentration of one or more materials within a portion of the waveguide 100 to cause the refractive index within that portion of the waveguide to have a non-zero gradient in the direction of propagation 300 defined by the waveguide 100. For example, gray-scale lithography may be used to provide a gradient diffusion barrier which supplements the existing material of the waveguide with varying degrees of compound elements which gives rise to the non-zero gradient of the refractive index in the direction of propagation 300. That portion of the waveguide 100 having the non-zero refractive index gradient is the active region 100.

In an example embodiment, the active region 110 is formed by forming a sub-wavelength grating within a portion of the waveguide 100 such that the effective refractive index profile is non-constant across the portion of the waveguide in the direction of propagation 300. The portion of the waveguide 100 having the sub-wavelength grating (and/or the non-constant effective refractive index profile) is the active region 110. As should be understood by one skilled in the art in light of this disclosure, various methods may be used to manufacture a waveguide 100 having an active region 110 (e.g., a portion of the waveguide wherein the refractive index profile or effective refractive index profile is non-constant along the direction of propagation 300 defined by the waveguide 100). As should also be understood, reference to the refractive index herein is inclusive of the effective refractive index unless otherwise indicated.

In an example embodiment, the active region 110 is formed by performing successive depositions to form the non-zero gradient of the refractive index in the direction of propagation 300. For example, successive depositions may each deposit a slightly different composition in a region of the waveguide to create a region of the waveguide having a non-zero gradient of the refractive index in the direction of propagation 300.

The terms "non-constant" and "non-zero" as used herein should be understood within an engineering and manufacturing context. For example, engineering and/or manufacturing guidelines for a particular waveguide 100 may indicate that the refractive index within the guiding region 105 is constant if the refractive index does not change by more than 1%, 2%, or 5%, (or other standard tolerance with respect to the application) over the length of the guiding region and/or a portion thereof, in various embodiments. In contrast, in some embodiments, the refractive index of the active region changes from 1.99 to 1.5 (corresponding to the effective indices of these materials at the C band) over 40 µm. In some example embodiments, the gradient of the refractive index of the active region in the direction of propagation may be proportional to, for example, 1, x, $x^2$, and/or the like. For example, the refractive index of the active region may be non-constant in a linear, quadratic, cubic, or other polynomial manner, in various embodiments. Thus, in various embodiments, the refractive index of the active region 110 is non-constant and/or the gradient of the refractive index in the direction of propagation 300 is non-zero with respect to the engineering and/or manufacturing guidelines corresponding to the guiding region 105, active region 110, and waveguide 100. For example, the refractive index of the guiding region 105 is constant and the refractive index of the active region is non-constant with respect to engineering and/or manufacturing guidelines corresponding to the waveguide 100.

In an example embodiment, a mirror 120 is disposed between the active region 110 and the substrate 200. In various embodiments, the mirror 120 may be a metallic mirror or a dielectric mirror. For example, the mirror 120 may extend along a first surface of the active region 110. For example, the first surface may be opposite the coupling surface 115. In an example embodiment, the mirror 120 is disposed on a surface of the substrate and sandwiched between the substrate 200 and the active region 110. In another example embodiment, the mirror 120 is buried, embedded, and/or the like within the substrate 200 and, for example, is sandwiched between the substrate 200 and the active region 110. In an example embodiment, the mirror 120 is disposed on a surface of the active region 110 opposite the substrate 200 such that the coupling surface 115 is adjacent the substrate 200 and the electromagnetic beam may be coupled into an optical fiber through the substrate 200. In an example embodiment, the mirror 120 may prevent a portion of the electromagnetic beam from exiting the active region 110 in a direction toward the substrate 200. In an example embodiment, the presence of the mirror 120 may strengthen the effect of the electromagnetic beam propagating through the waveguide 100, and/or a portion of the beam, exiting the waveguide 100 through the coupling surface 115. For example, any portion of the beam exiting the active region 110 in a direction toward the substrate 200 is reflected back toward the coupling surface 115.

In an example embodiment, the mirror 120 defines a plane. For example, the reflective surface of the mirror 120 may be planar. In general, the plane defined by the mirror 120 is parallel to a plane defined by the surface of the substrate 200. Additionally, the direction of propagation 300 is generally parallel to the plane defined by the mirror 120. When an electromagnetic beam travels through the active region, the beam and/or a portion of the beam is refracted (and possibly reflected off of the mirror 120) such that the group velocity 305 of the beam and/or portion thereof has a non-zero component 310 in a direction that is perpendicular or substantially perpendicular to the direction of propagation 300 of the waveguide 100 and perpendicular or substantially perpendicular to the plane defined by the mirror 120. In an example embodiment, the non-zero component 310 is considered to be substantially perpendicular to the direction of propagation 300 when the direction of the non-zero component 310 is within engineering and/or manufacturing tolerances appropriate for the application of perpendicular to the direction of propagation 300. For example, as illustrated in FIGS. 1 and 2, the mirror 120 may define the xy plane, and the direction of propagation 300 may be in the x direction. The electromagnetic beam, and/or a portion thereof, traveling through the active region 110 may be refracted and/or reflected off the mirror 120 such that the group velocity 305 of the beam and/or portion thereof has a non-zero component 310 in the z direction. As should be understood, the non-zero component 310 may be a component of the group velocity and may not account for the entirety of the group velocity of the beam. For example, in a beam having a non-zero component 310, the group velocity has a non-zero z-component and a non-zero x-component (and possibly a non-zero y-component).

In an example embodiment, the refractive index profile in the active region 110 is non-constant in a direction transverse to the direction of propagation 300. For example, the gradient of the refractive index with respect to a direction transverse to the direction of propagation 300 may be non-zero in the active region 110 and/or a portion of the active direction. For example, the gradient of the refractive index with respect to the y direction, z direction, and/or other direction within the yz plane (as illustrated in FIG. 1) may be non-zero within the active region 110 and/or a portion thereof. In an example embodiment, the active region 110 may have a non-zero refractive index gradient across the width of the active region 110 (e.g., the y direction as illustrated in FIG. 1) to reduce the power divergence of the electromagnetic beam that exits the waveguide 100 through the coupling surface 115, for example.

Example Simulation Results

Results of three simulations demonstrating the use of a waveguide 100 having an active region 110 to provide lateral coupling of the waveguide 100 through the coupling surface 115 are now discussed with respect to FIGS. 3, 4, 5A, 5B, 5C, 6A, 6B, 6C, and 7. These three simulations share the same simulated system other than the refractive index profile of the active region 110. As should be understood by one skilled in the art in light of this disclosure, these simulations provide merely an example of some possible embodiments of a waveguide 100 having an active region 110 to provide lateral coupling of the waveguide 100 through a coupling surface 115 of the active region 110.

FIG. 3 is a schematic side-view of the simulated system. In these example simulations, the guiding region 105 of the waveguide 100 has a refractive index n=1.99, the substrate 200 as a refractive index of n=1.5, the environment 400 has a refractive index n=1, and the active region 110 has a refractive index that is a function of position along the direction of propagation 300 (e.g., the x-direction in FIG. 3) of n=f(x). In these example simulations, the guiding region 105 has a length of 10 µm, the active region 110 has a length of 40 µm, and the waveguide has an extent of 300 nm in the z-direction. In general, the length of the guiding region 105 is minimized in these simulations as the region under investigation is the active region 110. The mirror 120 is simulated as a perfect electric conductor (PEC) boundary condition. The simulated system is bounded by a perfect match layer (PML) (e.g., a perfect absorber) boundary condition. In the illustrated example simulations, the waveguide 100 is made of Silicon Nitride and the substrate is made of Silicon Oxide. A beam of light is input to the guiding region 105 from the left side of FIG. 3 and propagates toward the right side of FIG. 3. The end of the active region is located at x=0.

FIG. 4 illustrates the refractive index profiles of the active region 110 used in the three different simulations. In the first simulation, the refractive index of the active region 110 decreases in the direction of propagation linearly (e.g., $f(x) \propto x$), as shown by the solid line in FIG. 4. In the second simulation, the refractive index of the active region 110 decreases in the direction of propagation parabolically (e.g., $f(x) \propto x^2$), as shown by the dot-dashed line in FIG. 4. In the third simulation, the refractive index of the active region 110 decreases in the direction of propagation cubically (e.g., $f(x) \propto x^3$), as shown by the dotted line in FIG. 4.

FIGS. 5A, 5B, and 5C show the simulation results for each of the first, second, and third simulations, respectively. For example, FIG. 5A shows the simulated power flow of the first simulation in the form of the electric field norm or amplitude or irradiance. FIGS. 5B and 5C show similar simulated power flows for the second and third simulations, respectively, in the form of the electric field norm or amplitude. FIG. 6A shows a contour plot of the power flow illustrated in FIG. 5A. Similarly, FIG. 6B shows a contour plot of the power flow illustrated in FIG. 6B and FIG. 6C shows a contour plot of the power flow illustrated in FIG. 5C. As can be seen in each of FIGS. 5A, 5B, 5C, 6A, 6B, and 6C, the simulated electromagnetic beam travelling through the guiding region 105 propagates along the waveguide 100, through the interface A, and into the active region 110. Within the active region 110, the non-constant refractive index profile (and/or the non-zero refractive index gradient) with respect to the propagation direction causes the beam, and/or at least a portion of the beam, to be refracted such that the group velocity 305 of the beam or portion of the beam has a group velocity component 310 that is perpendicular to the direction of propagation and perpendicular to the plane defined by the mirror 120. For example, the electromagnetic beam, and/or at least a portion thereof, may be refracted such that the beam and/or portion thereof exits the waveguide 100 via the coupling surface 115.

FIG. 7 provides a table of the power loss calculated for each simulation (not including any fiber coupling losses). The power loss is calculated by summing the power flux across the line 405 shown in FIG. 3 and comparing the summed power flux across the line 405 to the power input supplied to the guiding region 105 of the waveguide 100. These three example simulations show a loss of –0.94 to –1 dB, depending on the refractive index profile of the active region 110. As should be seen from FIGS. 5A, 5B, 5C, 6A, 6B, 6C, and 7, the coupling effect provided by active region 110 does not appear to be highly sensitive to the particular refractive index profile of the active region.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A waveguide formed on a substrate, the substrate defining a plane, the waveguide comprising:
an active region, wherein a refractive index profile of the active region is non-constant in a first direction parallel to the plane defined by the substrate.

2. The waveguide of claim 1, wherein the refractive index profile of the active region monotonically decreases in the first direction.

3. The waveguide of claim 1, wherein when an electromagnetic beam travels through the active region, at least a portion of the beam is refracted such that the at least a portion of the beam develops a non-zero group velocity component in a direction that is perpendicular to the first direction.

4. The waveguide of claim 1, wherein the active region further comprises a dielectric or metallic mirror that extends along at least one surface of the active region.

5. The waveguide of claim 4, wherein when an electromagnetic beam travels through the active region, at least a portion of the beam is refracted such that the at least a portion of the beam develops a non-zero group velocity component in a direction that is perpendicular to both the first direction and a plane defined by the dielectric or metallic mirror.

6. The waveguide of claim 1, wherein the refractive index of the active region is non-constant along a direction perpendicular to the first direction.

7. The waveguide of claim 1, wherein the active region is used to couple the waveguide to an optical fiber via a coupling surface of the active region, the coupling surface defining a plane that is substantially parallel to the first direction.

8. The waveguide of claim 7, wherein the coupling surface defines a plane that is substantially parallel to the plane defined by the substrate.

9. The waveguide of claim 1, wherein the substrate is a wafer.

10. The waveguide of claim 1, wherein the refractive index profile of the active region is formed using a gray-scale-lithography process.

11. The waveguide of claim 1, wherein the refractive index profile of the active region is formed by changing an effective index profile of the active region using a sub-wavelength grating.

12. A photonic integrated circuit comprising:
a waveguide formed on a substrate, the substrate defining a plane, the waveguide comprising:
an active region, wherein a refractive index profile of the active region is non-constant in a first direction parallel to the plane defined by the substrate.

13. The photonic integrated circuit of claim 12, wherein the refractive index profile of the active region monotonically decreases in the first direction.

14. The photonic integrated circuit of claim 12, wherein when an electromagnetic beam travels through the active region, at least a portion of the beam is refracted such that the at least a portion of the beam develops a non-zero group velocity component in a direction that is perpendicular to the first direction.

15. The photonic integrated circuit of claim 12, wherein the active region further comprises a dielectric or metallic mirror that extends along one surface of the active region.

16. The photonic integrated circuit of claim 15, wherein when an electromagnetic beam travels through the active region, at least a portion of the beam is refracted such that the at least a portion of the beam develops a non-zero group velocity component in a direction that is perpendicular to both the first direction and a plane defined by the dielectric or metallic mirror.

17. The photonic integrated circuit of claim 12, wherein the refractive index of the active region is non-constant along a direction perpendicular to the first direction.

18. The photonic integrated circuit of claim 12, further comprising an optical fiber, wherein the active region is used to couple the waveguide to the optical fiber.

19. The photonic integrated circuit of claim 12, wherein the refractive index profile of the active region is formed using at least one of (a) a grayscale-lithography process or (b) a successive deposition process.

20. The photonic integrated circuit of claim 12, wherein the refractive index profile of the active region is formed by changing an effective index profile of the active region using a sub-wavelength grating.

* * * * *